(12) United States Patent
Lazzarini et al.

(10) Patent No.: US 10,321,701 B2
(45) Date of Patent: Jun. 18, 2019

(54) MACHINE FOR MAKING AND DISPENSING LIQUID AND/OR SEMI-LIQUID FOOD PRODUCTS

(71) Applicant: ALI S.p.A.-CARPIGIANI GROUP, Milan (IT)

(72) Inventors: Roberto Lazzarini, Reggio Emilia (IT); Andrea Cocchi, Calderara di Reno (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 0 days.

(21) Appl. No.: 14/924,099

(22) Filed: Oct. 27, 2015

(65) Prior Publication Data

US 2016/0128355 A1    May 12, 2016

(30) Foreign Application Priority Data

Nov. 6, 2014 (IT) .............................. BO2014A0623

(51) Int. Cl.
| | | |
|---|---|---|
| A23G 9/08 | (2006.01) | |
| A23G 9/22 | (2006.01) | |
| A23G 9/28 | (2006.01) | |

(52) U.S. Cl.
CPC .............. *A23G 9/281* (2013.01); *A23G 9/08* (2013.01); *A23G 9/227* (2013.01)

(58) Field of Classification Search
CPC . A23G 9/08; A23G 9/281; A23G 9/28; A23G 9/227; A23G 1/10; B65D 43/0204; B65D 2251/1083; B65D 2251/10; B65D 2251/0018; B65D 2517/0032; B65D 2517/0073; B65D 41/18; B65D 41/16; B65D 45/18; B65D 47/2018; B65D 2543/00046; B65D 2543/00092; A01J 25/008; A01J 25/114; A47J 31/4485; A47J 36/06; A23L 3/22; A45D 40/221; A47K 10/421; H01L 2924/01079; B65F 1/1607

(Continued)

(56) References Cited

U.S. PATENT DOCUMENTS 3,933,296 A * 1/1976 Ruskin ................. B65D 75/245
                                                                  206/541
4,143,695 A * 3/1979 Hoehn ................... A45C 11/20
                                                                  220/215

(Continued)

FOREIGN PATENT DOCUMENTS

| EP | 2189067 A1 | 5/2010 |
| EP | 2484224 A1 | 8/2012 |
| GB | 183740 A | 8/1922 |

OTHER PUBLICATIONS

Italian Search Report dated Jul. 15, 2015 for related Italian patent Application No. IT BO20140613.

*Primary Examiner* — Dana Ross
*Assistant Examiner* — Joseph W Iskra
(74) *Attorney, Agent, or Firm* — Shuttleworth & Ingersoll, PLC; Timothy J. Klima (57) ABSTRACT

A machine for making and dispensing liquid and/or semi-liquid food products comprises a supply tank equipped with a loading mouth through which the ingredients necessary to make the basic product are loaded, and a lid for opening and closing the loading mouth; the lid comprises a covering wall with at least two parts which are foldable relative to each other and which are joined to each other by a folding line.

12 Claims, 5 Drawing Sheets

(58) Field of Classification Search
USPC .......... 99/455, 485, 452, 459, 453; 220/826,
220/810, 259.2, 259.1, 256.1, 254.6,
220/254.3, 254.1, 254.2, 200
See application file for complete search history.

(56) References Cited

U.S. PATENT DOCUMENTS

| | | | | |
|---|---|---|---|---|
| 4,653,281 A * | 3/1987 | Van Der Veer | ........ | A23G 9/045 366/144 |
| 4,693,399 A * | 9/1987 | Hickman | ........... | B65D 47/0847 215/235 |
| 4,896,070 A * | 1/1990 | Reid | ........... | A47B 81/06 220/826 |
| 5,111,956 A * | 5/1992 | Jow | ........... | A47G 19/26 220/811 |
| 5,673,811 A | 10/1997 | Dickinson et al. | | |
| RE37,634 E * | 4/2002 | Hickman | ........... | B65D 47/0847 215/235 |
| 6,540,098 B1 | 4/2003 | Jarvis et al. | | |
| 7,258,255 B2 * | 8/2007 | Vogel | ........... | B65D 47/0847 215/237 |
| 7,913,868 B2 * | 3/2011 | Dolan | ........... | B65D 47/0847 220/254.2 |
| 8,757,429 B2 * | 6/2014 | Stevens | ........... | B65D 43/0212 215/235 |
| 8,800,814 B2 * | 8/2014 | Braun | ........... | B67D 3/0009 222/105 |
| 2006/0037964 A1 * | 2/2006 | Su | ........... | B65D 21/0212 220/826 |
| 2007/0131701 A1 * | 6/2007 | Herbert | ........... | B65D 21/0233 220/826 |
| 2008/0190951 A1 * | 8/2008 | Gallagher | ........... | B65D 21/0233 220/826 |
| 2011/0000919 A1 * | 1/2011 | Whalen | ........... | B65D 25/32 220/500 |
| 2013/0233874 A1 * | 9/2013 | Sundnes | ........... | B65D 43/16 220/826 |
| 2014/0021214 A1 * | 1/2014 | Jack | ........... | B65D 43/0202 220/826 |

* cited by examiner

MACHINE FOR MAKING AND DISPENSING LIQUID AND/OR SEMI-LIQUID FOOD PRODUCTS

This application claims priority to Italian Patent Application IT BO2014A000623 filed Nov. 6, 2014, the entirety of which is incorporated by reference herein.

BACKGROUND OF THE INVENTION

This invention relates to a machine for making and dispensing liquid and/or semi-liquid food products.

More specifically, this invention relates to machines for the patisserie and ice cream sectors and used for making and dispensing liquid or semi-liquid food products, such as, for example, ice creams, whipped cream, creams, chocolate, yogurt, granita, sorbets and the like, which require at least one thermal treatment in their production cycles.

Generally, speaking, these machines comprise a product processing tank and at least one dispensing tap mounted on the front of the tank.

These machines also comprise a stirrer mounted inside the tank to mix the product.

According to known methods, the thermal treatment is generally performed by means of electrical resistors and/or a refrigerating system.

The product is thus processed both mechanically, by means of the stirrer, and thermally, by means of heating and/or cooling units.

At the top of it, the tank is provided with a mouth which can be opened and closed by means of a lid.

Examples of machines of this kind are described in patent applications EP 2189067 A1 and EP 2484224 A1.

Generally speaking, to open the supply tank, the lid is removed and placed on a support adjacent to the machine (creating potential problems of hygiene and food safety).

More precisely, to better clarify the above, it may be observed that placing the lid on a support which has not been adequately sanitized may lead to potential food safety risks, that is to say, risks of contaminating the product which is processed next.

In some machines, the lid is hinged to the supply tank so that it can be turned between the open and closed positions.

Whatever the case, the space occupied by the lid when the supply tank is open constitutes a problem, especially where there is little room around the machine.

SUMMARY OF THE INVENTION

This invention has for an aim to overcome the above mentioned problem. This aim is fully achieved by the machine of the invention as characterized in the appended claims.

BRIEF DESCRIPTION OF THE DRAWINGS

The technical features and advantages of the invention are more apparent in the following description of a preferred but non-limiting embodiment of it. The description refers to the accompanying drawings, which are also provided purely by way of non-limiting example and in which.

DESCRIPTION OF THE PREFERRED EMBODIMENTS

Figure 1:
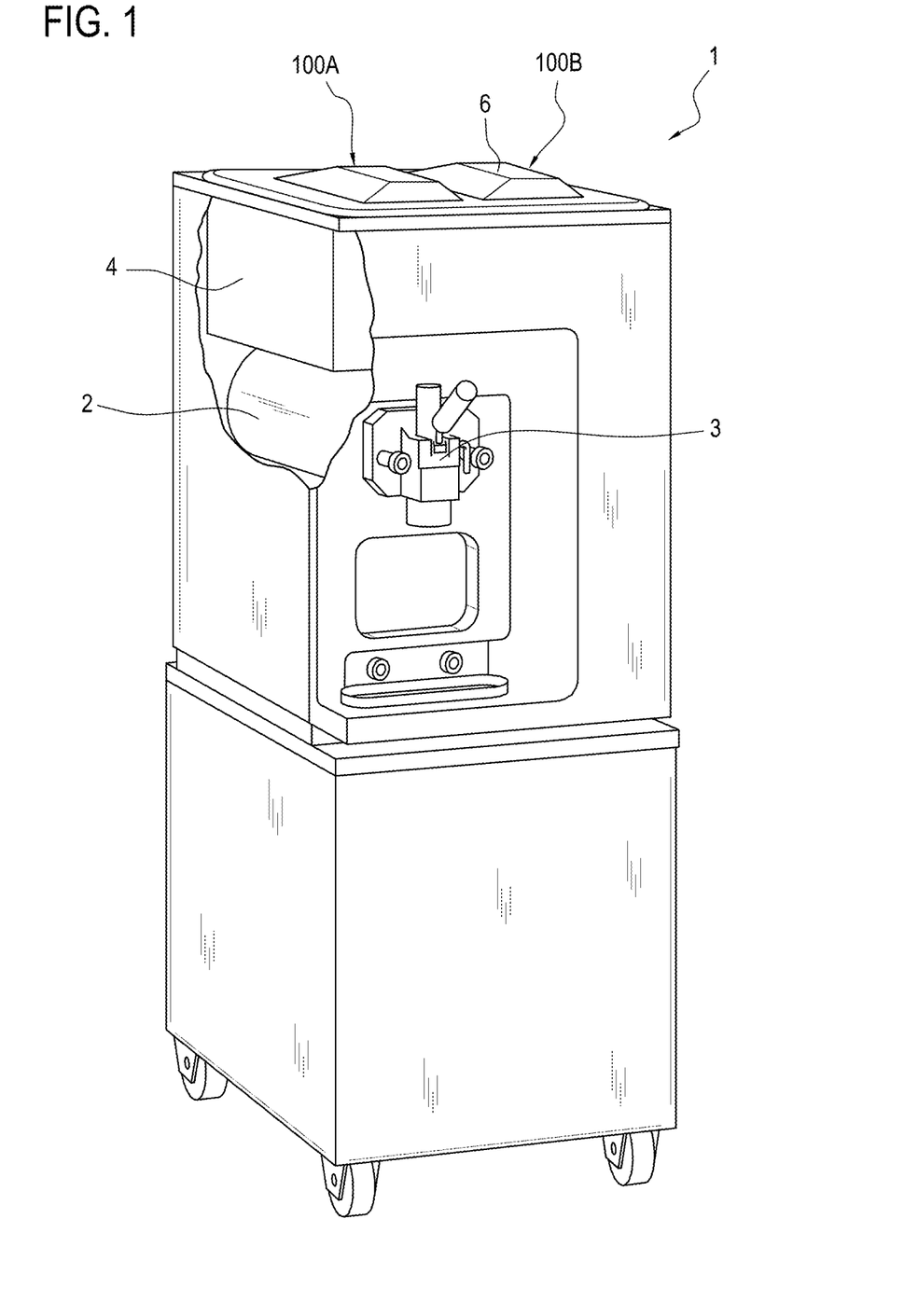
FIG. 1 is a perspective view of a machine made according to this invention.

With reference to FIG. 1, the numeral 1 denotes in its entirety a machine for making and dispensing liquid or semi-liquid products, ice creams in particular. By way of a non-limiting example, the machine comprises a chamber 2 for containing the ice cream to be processed, a dispensing tap 3 mounted at the bottom of the front of the chamber 2 and a stirrer (not illustrated) located inside the chamber 2 to mix the ice cream.

It should be noted, therefore, that more in general, the machine 1 comprises a dispenser 3 which is directly or indirectly (by means of other elements and/or chambers) connected to the tank 4.

The machine 1 also comprises means for thermally treating the ice cream contained in the chamber 2 and which are not illustrated because they are of known type and are not an object of the invention.

The processing chamber 2 is in communication with a supply tank 4 above it (forming part of the machine 1 according to the invention) which is in turn provided, at the top of it, with a mouth 5 for loading the ingredients needed to make the ice cream to be dispensed.

The tank 4 is also equipped with means for thermally treating the product, in particular a heat exchanger (either electrical or thermodynamic).

The mouth 5 is fed by the operator and can be opened and closed by means of a lid 6 forming part of the machine according to the invention.

The lid 6 is made preferably of elastomer (preferably a thermoplastic elastomer).

Still more preferably, the lid 6 is injection molded.

Preferably, the lid is made of Santoprene☐.

As better illustrated in FIGS. 3-8, the lid 6 comprises a covering wall 7 with at least two parts 8 which are foldable relative to each other.

According to one aspect, it should be noted that the lid 6 is a single piece.

In other words, the different foldable parts 8 are connected to each other in such a way as to define a single covering element.

It should be noted that according to this aspect, the top surface of the lid is an uninterrupted surface.

Advantageously, according to this aspect, there are no hinges or other joints or mechanical connecting elements between the different parts 8.

The parts 8 are foldable between a closed configuration in which the parts 8 all lie in substantially the same plane to form a flat closing surface and an open configuration in which the parts 8 are positioned at an angle to each other (that is to say, they lie in different planes).

The parts 8 are joined to each other by a folding line 9.

It should be noted that the folding line 9 is preferably defined by a reduction in the thickness of the lid 6.

In the closed configuration, the wall 7 is a substantially uninterrupted surface.

More specifically, the covering wall 7 comprises a plurality of parts 8 (four in the example illustrated) which can be folded relative to each other.

The parts 8 are joined to each other in twos by respective folding lines 9.

That way, the covering wall 7 can be folded (rolled) on itself.

Preferably, the folding lines 9 are parallel to each other.

According to one aspect, each folding line 9 is defined by a strip 10 (that is, a portion) of the covering wall 7 (of reduced thickness).

The strips 10 are alternated with the parts 8 and are reduced in thickness compared to the latter so that they can be easily folded.

In practice, thanks to its flexibility, each strip 10 acts as a connecting hinge between the two parts 8 adjacent to it. An upper side of the covering wall 7 includes a first projecting protrusion 100A and a second projecting protrusion 1008 both projecting above the upper side of the covering wall 7, the first projecting protrusion 100A and the second projecting protrusion 1008 are positioned adjacent one another on opposite sides of one of the respective folding lines 9 such that the first projecting protrusion 100A is positioned on one of the plurality of parts 8 and the second projecting protrusion 100B is positioned on another of the plurality of parts 8.

Figure 7:
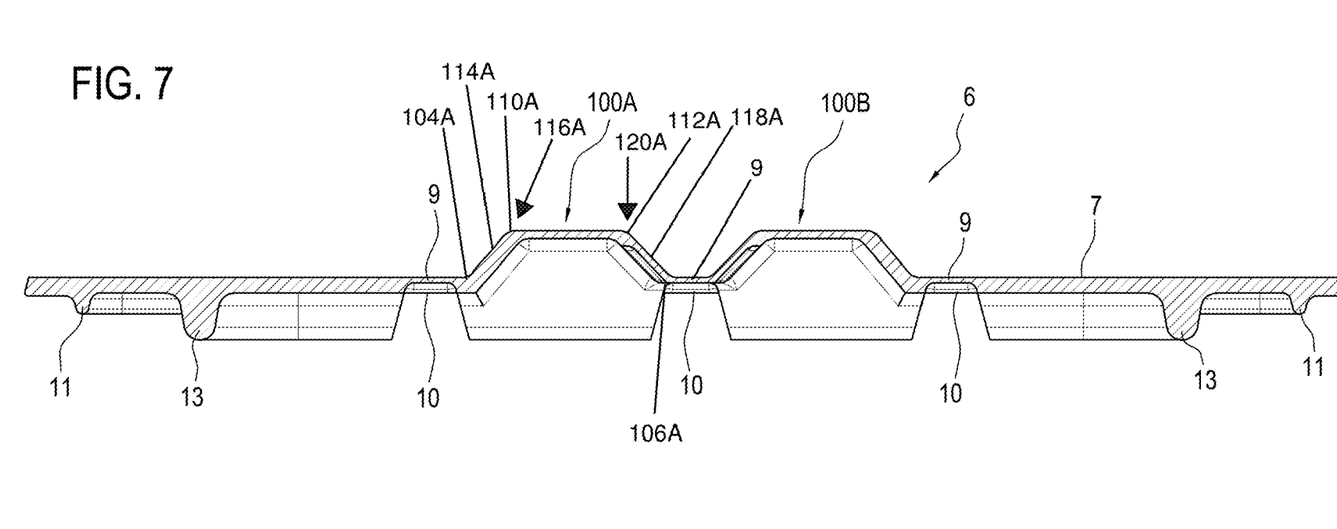
FIGS. 7 and 8 are, respectively a longitudinal cross section and a transverse cross section of the lid of the machine of FIG. 1.
Figure 8:
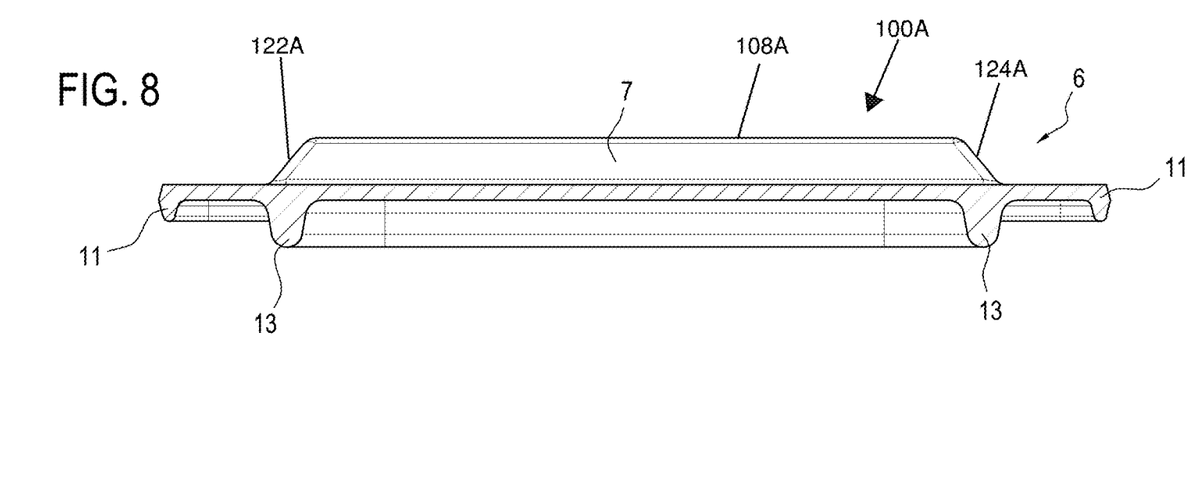

The first projecting protrusion includes, in an end view along a first line parallel to at least one of the plurality of folding lines, an exterior shape including: a base 102A adjacent the upper side of the covering wall 7 and including a base first side 104A, an opposite base second side 106A and a base width $W_B$ between the base first side and the base second side in a direction normal to the at least one of the plurality of folding lines; a top face 108A positioned above the upper side of the covering wall 7 and including a top face first side 110A, an opposite top face second side 112A and a top face width $W_{TF}$ between the top face first side 110A and the top face second side 112A in the direction normal to the at least one of the plurality of folding lines, the top face width $W_{TF}$ being less than the base width $W_B$; a first side face 114A connecting the base first side 104A to the top face first side 110A at a first corner 116A; a second side face 118A connecting the base second side 106A to the top face second side 112A at a second corner 120A;

The second projecting protrusion includes, in an end view along a second line parallel to the at least one of the plurality of folding lines, an exterior shape including: a base adjacent the upper side of the covering wall and including a base first side, an opposite base second side and a base width between the base first side and the base second side in the direction normal to the at least one of the plurality of folding lines; a top face positioned above the upper side of the covering wall and including a top face first side, an opposite top face second side and a top face width between the top face first side and the top face second side in the direction normal to the at least one of the plurality of folding lines, the top face width being less than the base width; a first side face connecting the base first side to the top face first side at a first corner; a second side face connecting the base second side to the top face second side at a second corner;

The first side face 114A, the first corner 116A, the top face 108A, the second corner 120A and the second side face 118A of the first projecting protrusion form a first projecting protrusion engagement perimeter. The first side face, the first corner, the top face, the second corner and the second side face of the second projecting protrusion form a second projecting protrusion engagement perimeter. The first projecting protrusion engagement perimeter engages the second projecting protrusion engagement perimeter when a portion of the lid is folded back on itself to limit an angle of rotation of the portion of the lid with respect to an unfolded portion of the lid.

The first projecting protrusion exterior shape further includes a first end face 122A positioned at a first end of the base, the top face, the first side face and the second side face and a second end face 124A positioned at an opposite second end of the base, the top face, the first side face and the second side face. The second projecting protrusion exterior shape further includes a first end face positioned at a first end of the base, the top face, the first side face and the second side face and a second end face positioned at an opposite second end of the base, the top face, the first side face and the second side face. One or more of the first projecting protrusion first corner, the first projecting protrusion second corner, the second projecting protrusion first corner and the second projecting protrusion second corner can include a relieved edge 126A. See FIGS. 3 and 6.

In alternating with each other, the parts 8 and the strips 10 together define the covering wall 7.

In addition to the wall 7, the lid 6 has a perimeter edge 11 for closing the loading mouth 5 (which, when in use (that is to say, when the wall 7 is in the closed configuration and the lid 6 is coupled to the tank 4), faces the inside of the tank 4.

The perimeter edge 11 projects from the covering wall 7 in cantilever fashion.

The perimeter edge 11 preferably has a break 12 in it at each stretch where the perimeter edge 11 itself intersects one of the folding lines 9.

The lid also has a condensate collecting collar 13.

The collar 13 projects in cantilever fashion from the wall 7 and, in use (when the lid 6 is in the closed configuration), faces the inside of the tank.

More precisely, the collar 13 projects in cantilever fashion from the same side as the perimeter edge 11.

Preferably, the collar 13 is spaced from the perimeter edge 11 by a length which is just slightly greater than the thickness of the loading mouth 5, that is to say, the thickness of the walls of the tank 4 at the loading mouth 5.

In order to facilitate bending of the strips 10, the collar 13 (like the edge 11) also has a break 14 in it at each stretch where the collar 13 itself intersects one of the folding lines 9.

When the covering wall 7 is extended (in the closed configuration), the lid 6 perfectly closes the loading mouth 5.

When the operator needs to feed the tank 4, the lid 6 can be conveniently opened by folding it on itself, that is to say, by folding the parts 8 along the respective folding lines 9.

More specifically, the operator first of all folds the last and second last of the parts 8 and then all the others in ordered manner.

Figure 2:
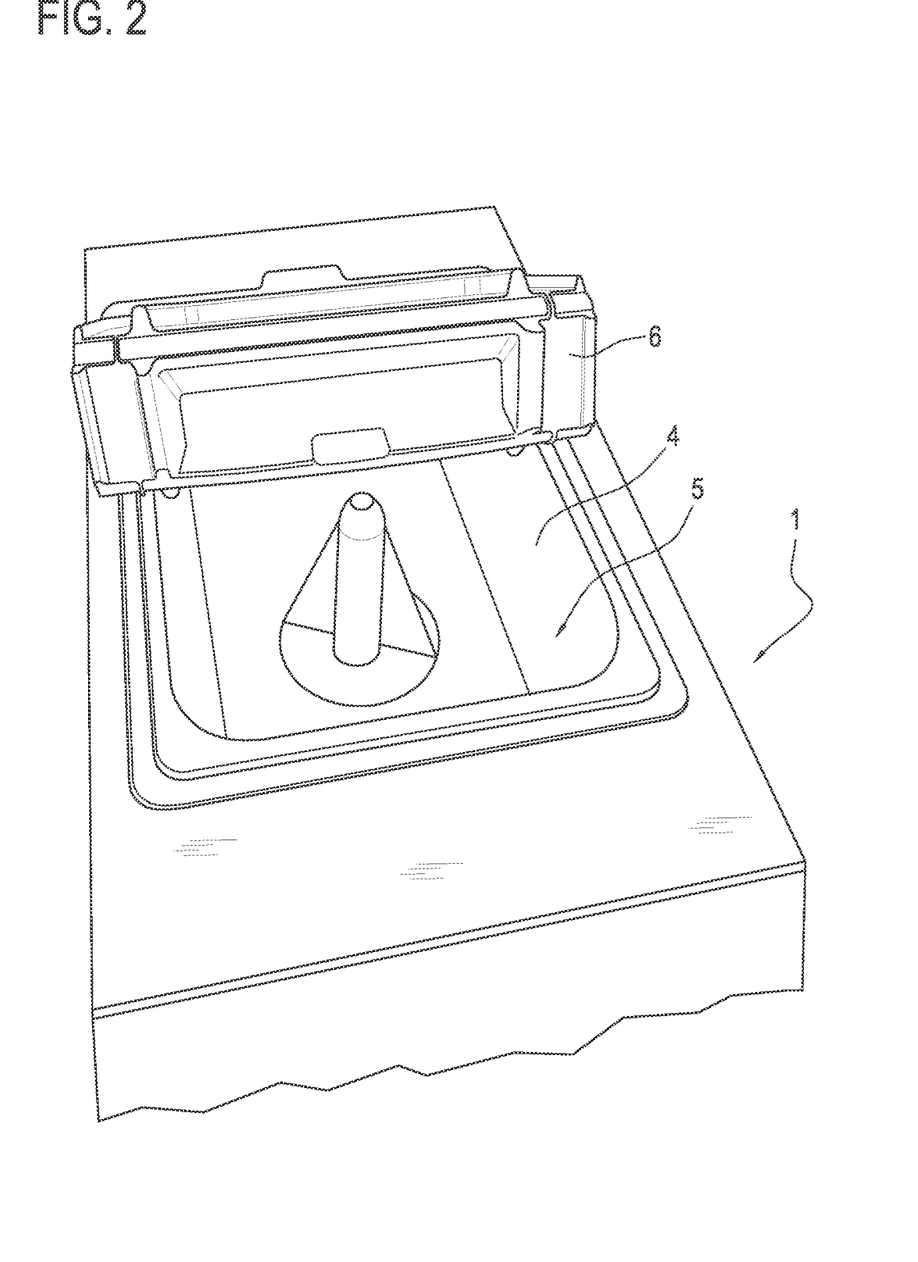
FIG. 2 is a perspective view of a detail of the machine of FIG. 1 in a different operating configuration.
Figure 3:
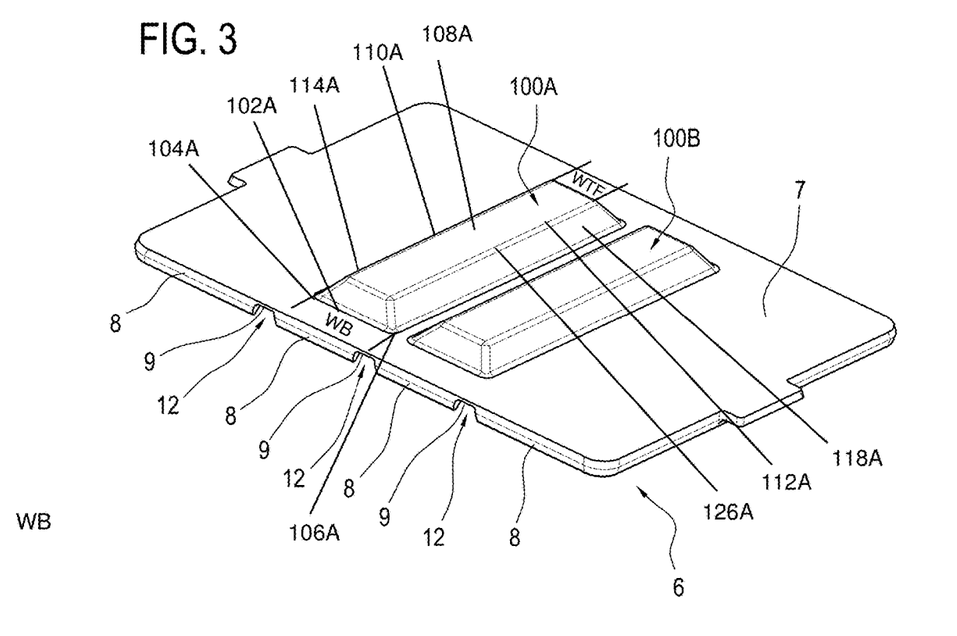
FIGS. 3 and 4 are two perspective views showing opposite sides of the lid of the machine of FIG. 1.
Figure 4:
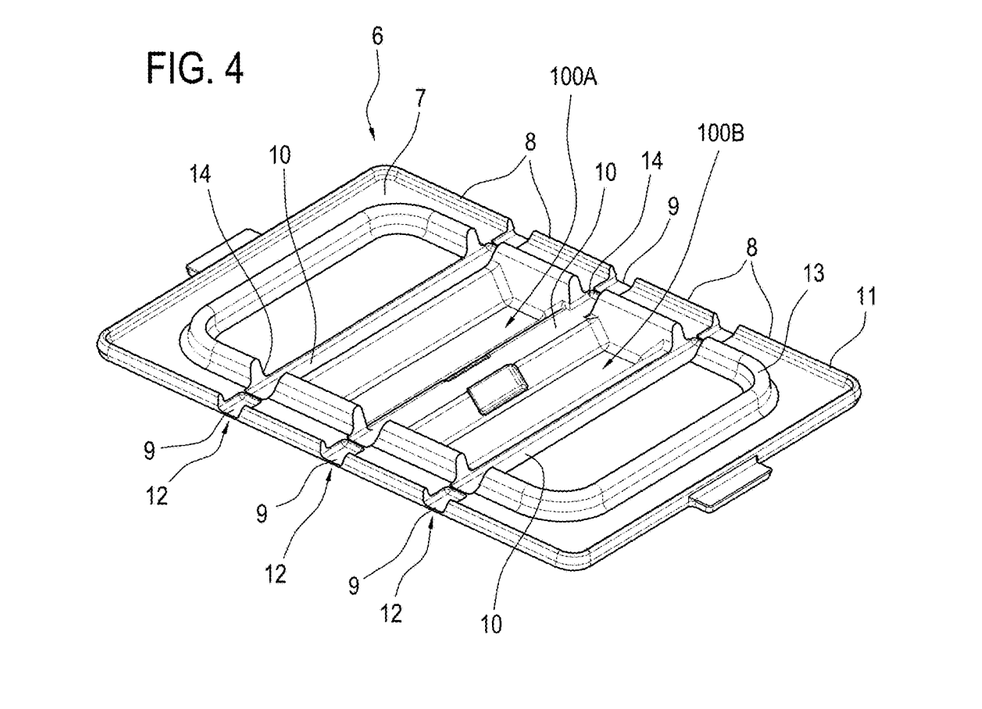
Figure 5:
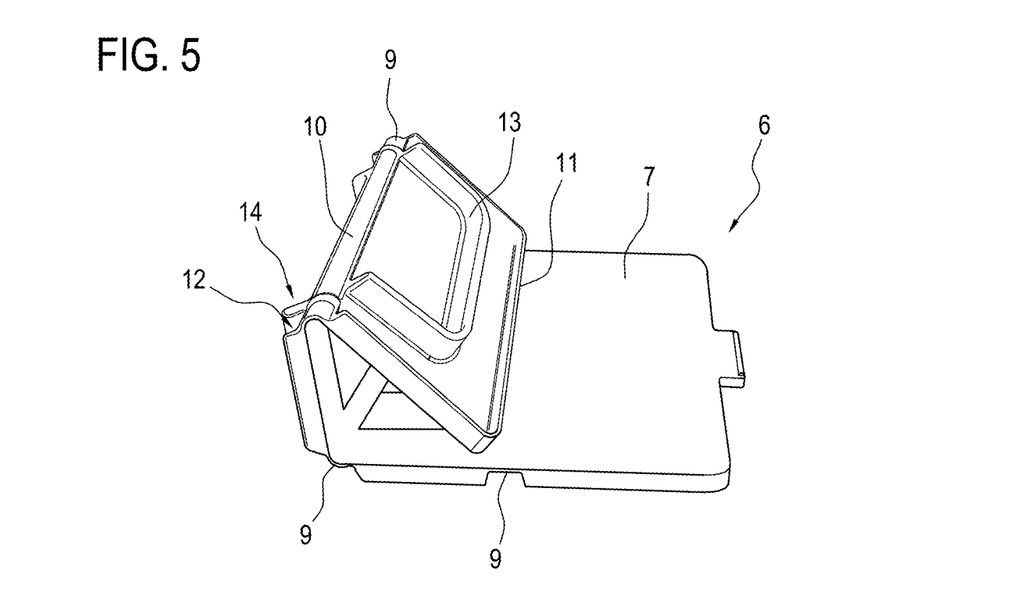
FIGS. 5 and 6 are two perspective views showing the lid of the machine of FIG. 1 in two different operating configurations.
Figure 6:
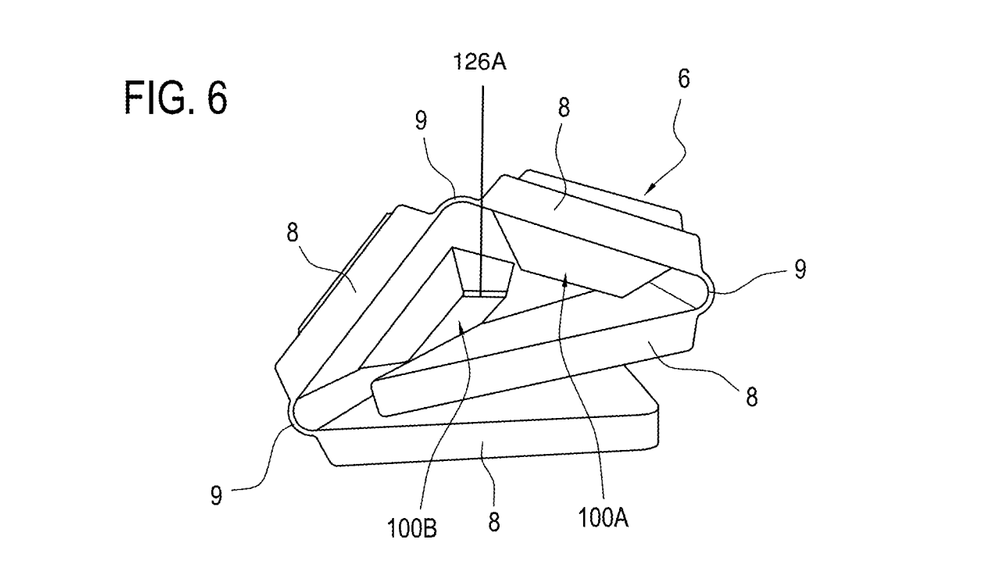

In other words, instead of removing the lid 6 from the tank 4, the operator can leave the lid 6 conveniently folded on the loading mouth 5 thanks to its limited dimensions when it is in the folded configuration (as illustrated in FIG. 2).

Advantageously, that way, the lid 6 need not be rested on a supporting surface which is not part of the machine and which has not been adequately sanitized. This translates as improved food safety of the process of making the liquid or semi-liquid products.

It is stressed that although the above description is of a machine 1 for making and dispensing ice creams, this invention can just as well be advantageously applied to any machine intended for the patisserie, ice cream and related sectors, such as, for example, any machine used for making and dispensing whipped cream, creams or chocolate, or even yogurts, granitas, sorbets and the like.

The invention described above is susceptible of industrial application. It can be modified and adapted in several ways without thereby departing from the scope of the inventive concept. Moreover, all the details of the invention may be replaced with technically equivalent elements.

What is claimed is:

1. A machine for making and dispensing at least one chosen from liquid and semi-liquid food products, comprising:
    a tank for supplying and containing a basic product and which includes a loading mouth through which ingredients of the basic product are loaded, the tank including a heat exchanger for thermally treating the product;
    a dispenser directly or indirectly connected to the tank; and
    a lid for opening and closing the loading mouth;
    wherein the lid comprises a covering wall;
    wherein the covering wall comprises a plurality of parts which are foldable relative to each other; the plurality of parts being joined to each other in twos by a plurality of respective folding lines;
    wherein each of the plurality of respective folding lines is defined by a strip of the covering wall; the strip being reduced in thickness compared to the plurality of parts which are foldable relative to each other;
    wherein the lid has a perimeter edge for closing the loading mouth and the perimeter edge projects from the covering wall and includes a break at each stretch where the perimeter edge intersects one of the plurality of respective folding lines;
    wherein the lid comprises a condensate collecting collar which, when in a closed position closing the loading mouth, faces an inside of the tank;
    wherein the condensate collecting collar extends along a first side of the lid and also extends, at least partially, along a second side and a third side of the lid, the second side and the third side being adjacent opposite ends of the first side, respectively;
    wherein the condensate collecting collar includes a break at each stretch where the condensate collecting collar intersects one of the plurality of respective folding lines;
    wherein the condensate collecting collar projects in a cantilever manner from the covering wall from a same side of the covering wall as the perimeter edge;
    wherein an upper side of the covering wall includes a first projecting protrusion and a second projecting protrusion both projecting above the upper side of the covering wall, the first projecting protrusion and the second projecting protrusion positioned adjacent one another on opposite sides of one of the respective folding lines such that the first projecting protrusion is positioned on one of the plurality of parts and the second projecting protrusion is positioned on another of the plurality of parts,
    wherein the first projecting protrusion includes, in an end view along a first line parallel to at least one of the plurality of folding lines, an exterior shape including:
        a base adjacent the upper side of the covering wall and including a base first side, an opposite base second side and a base width between the base first side and the base second side in the direction normal to the at least one of the plurality of folding lines;
        a top face positioned above the upper side of the covering wall and including a top face first side, an opposite top face second side and a top face width between the top face first side and the top face second side in the direction normal to the at least one of the plurality of folding lines, the top face width being less than the base width;
        a first side face connecting the base first side to the top face first side at a first corner;
        a second side face connecting the base second side to the top face second side at a second corner;
    wherein the second projecting protrusion includes, in an end view along a second line parallel to the at least one of the plurality of folding lines, an exterior shape including:
        a base adjacent the upper side of the covering wall and including a base first side, an opposite base second side and a base width between the base first side and the base second side in the direction normal to the at least one of the plurality of folding lines;
        a top face positioned above the upper side of the covering wall and including a top face first side, an opposite top face second side and a top face width between the top face first side and the top face second side in the direction normal to the at least one of the plurality of folding lines, the top face width being less than the base width;
        a first side face connecting the base first side to the top face first side at a first corner;
        a second side face connecting the base second side to the top face second side at a second corner;
    wherein the first side face, the first corner, the top face, the second corner and the second side face of the first projecting protrusion forms a first projecting protrusion engagement perimeter;
    wherein the first side face, the first corner, the top face, the second corner and the second side face of the second projecting protrusion forms a second projecting protrusion engagement perimeter; and
    wherein the first projecting protrusion engagement perimeter engages the second projecting protrusion engagement perimeter when a portion of the lid is folded back on itself to limit an angle of rotation of the portion of the lid with respect to an unfolded portion of the lid.

2. The machine according to claim 1, and further comprising a product processing chamber.

3. The machine according to claim 1, wherein the plurality of respective folding lines are parallel to each other.

4. The machine according to claim 1, wherein the lid is made of elastomer material.

5. The machine according to claim 1, wherein the lid is made of a thermoplastic elastomer material.

6. The machine according to claim 1, wherein the lid is made of Santoprene.

7. The machine according to claim 1, wherein each of the plurality of respective folding lines defined by the strip forms a living hinge such that the covering wall, including the plurality of parts and plurality of living hinges, is a solid, unbroken wall extending across the plurality of parts within the perimeter edge.

8. The machine according to claim 1, wherein:
    the first projecting protrusion exterior shape further includes a first end face positioned at a first end of the base, the top face, the first side face and the second side face and a second end face positioned at an opposite second end of the base, the top face, the first side face and the second side face;
    the second projecting protrusion exterior shape further includes a first end face positioned at a first end of the base, the top face, the first side face and the second side face and a second end face positioned at an opposite second end of the base, the top face, the first side face and the second side face.

9. The machine according to claim 8, wherein:
the first projecting protrusion top face, first side face and second side face are flat;
the second projecting protrusion top face, first side face and second side face are flat.

10. The machine according to claim 1, wherein:
the first projecting protrusion top face, first side face and second side face are flat;
the second projecting protrusion top face, first side face and second side face are flat.

11. The machine according to claim 1, wherein at least one chosen from the first projecting protrusion first corner, the first projecting protrusion second corner, the second projecting protrusion first corner and the second projecting protrusion second corner includes a relieved edge.

12. A machine for making and dispensing at least one chosen from liquid and semi-liquid food products, comprising:
   a tank for supplying and containing a basic product and which includes a loading mouth through which ingredients of the basic product are loaded, the tank including a heat exchanger for thermally treating the product;
   a dispenser directly or indirectly connected to the tank; and
   a lid for opening and closing the loading mouth;
   wherein the lid comprises a covering wall;
   wherein the covering wall comprises a plurality of parts which are foldable relative to each other; the plurality of parts being joined to each other in twos by a plurality of respective folding lines;
   wherein each of the plurality of respective folding lines is defined by a strip of the covering wall; the strip being reduced in thickness compared to the plurality of parts which are foldable relative to each other;
   wherein the lid has a perimeter edge for closing the loading mouth and the perimeter edge projects from the covering wall and includes a break at each stretch where the perimeter edge intersects one of the plurality of respective folding lines;
   wherein the lid comprises a condensate collecting collar which, when in a closed position closing the loading mouth, faces an inside of the tank;
   wherein the condensate collecting collar extends along a first side of the lid and also extends, at least partially, along a second side and a third side of the lid, the second side and the third side being adjacent opposite ends of the first side, respectively;
   wherein the condensate collecting collar includes a break at each stretch where the condensate collecting collar intersects one of the plurality of respective folding lines;
   wherein the condensate collecting collar projects in a cantilever manner from the covering wall from a same side of the covering wall as the perimeter edge;
   wherein an upper side of the covering wall includes a first projecting protrusion and a second projecting protrusion both projecting above the upper side of the covering wall, the first projecting protrusion and the second projecting protrusion positioned adjacent one another on opposite sides of one of the respective folding lines such that the first projecting protrusion is positioned on one of the plurality of parts and the second projecting protrusion is positioned on another of the plurality of parts,
   wherein the first projecting protrusion includes, in an end view along a first line parallel to at least one of the plurality of folding lines, an exterior shape including:
      a base adjacent the upper side of the covering wall and including a base first side, an opposite base second side and a base width between the base first side and the base second side in a direction normal to the at least one of the plurality of folding lines;
      a first projecting protrusion engagement perimeter positioned above the upper side of the covering wall and connecting the base first side to the base second side;
   wherein the second projecting protrusion includes, in an end view along a second line parallel to the at least one of the plurality of folding lines, an exterior shape including:
      a base adjacent the upper side of the covering wall and including a base first side, an opposite base second side and a base width between the base first side and the base second side in the direction normal to the at least one of the plurality of folding lines;
      a second projecting protrusion engagement perimeter positioned above the upper side of the covering wall and connecting the base first side to the base second side;
   wherein the first projecting protrusion engagement perimeter engages the second projecting protrusion engagement perimeter when a portion of the lid is folded back on itself to limit an angle of rotation of the portion of the lid with respect to an unfolded portion of the lid.

* * * * *